(12) United States Patent
Lamberts et al.

(10) Patent No.: US 11,768,701 B2
(45) Date of Patent: Sep. 26, 2023

(54) EXCEPTION ANALYSIS FOR DATA STORAGE DEVICES

(71) Applicant: Western Digital Technologies, Inc., San Jose, CA (US)

(72) Inventors: Bernd Lamberts, San Jose, CA (US); Remmelt Pit, Menlo Park, CA (US); Cory J. Peterson, Rochester, MN (US); Kris Schouterden, San Jose, CA (US); David Hall, Rochester, MN (US); Shad Thorstenson, Rochester, MN (US); Andy Larson, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 292 days.

(21) Appl. No.: 16/572,973

(22) Filed: Sep. 17, 2019

(65) Prior Publication Data
US 2021/0081238 A1    Mar. 18, 2021

(51) Int. Cl.
*G06F 9/48*    (2006.01)
*G06F 9/46*    (2006.01)
*H04L 9/06*    (2006.01)
*G06F 16/23*   (2019.01)
*H04L 9/00*    (2022.01)

(52) U.S. Cl.
CPC ............ *G06F 9/4881* (2013.01); *G06F 9/466* (2013.01); *G06F 16/2365* (2019.01); *H04L 9/0637* (2013.01); *G06F 2209/481* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 4,413,318 A * | 11/1983 | Herrington | G06F 9/54 718/100 |
| 5,287,499 A * | 2/1994 | Nemes | G06F 12/0292 |
| 5,787,446 A * | 7/1998 | Dang | G06F 16/10 |
| 6,272,605 B1 * | 8/2001 | Le | G06F 3/0686 709/213 |
| 7,506,314 B2 | 3/2009 | Kollmann et al. | |
| 7,565,551 B2 | 7/2009 | Kirovski | |
| 7,653,899 B1 * | 1/2010 | Lindahl | G06F 11/3612 717/125 |
| 8,694,970 B2 | 4/2014 | Edgar et al. | |
| 8,719,791 B1 * | 5/2014 | MacPherson | G06F 11/3636 717/124 |
| 9,063,940 B1 * | 6/2015 | Humby | G06F 16/125 |
| 9,110,682 B2 | 8/2015 | Cao | |
| 9,329,789 B1 * | 5/2016 | Chu | G06F 12/0246 |

(Continued)

*Primary Examiner* — Adam Lee
(74) *Attorney, Agent, or Firm* — Barry IP Law, P.C.

(57) ABSTRACT

A Data Storage Device (DSD) includes a memory for storing data, and a controller configured to execute firmware or code to perform a task. While performing the task, the controller is further configured to assign unique identifiers to respective firmware or code portions that are executed to perform the task, and create a list or data structure including the unique identifier assigned to the firmware or code portion that created the task. A unique identifier is added to the list or data structure for each firmware or code portion executed for the task. The list or data structure indicates the order in which the firmware or code portions are executed.

20 Claims, 4 Drawing Sheets

(56) References Cited

U.S. PATENT DOCUMENTS

| | | | |
|---|---|---|---|
| 9,672,107 B1* | 6/2017 | Horn | G06F 11/1076 |
| 9,762,399 B2 | 9/2017 | Ghose | |
| 9,773,026 B1* | 9/2017 | Tetreault | G06F 11/3034 |
| 9,912,752 B1* | 3/2018 | Davis | G06F 16/2365 |
| 9,959,280 B1* | 5/2018 | Whitehead | G06F 16/13 |
| 10,146,612 B1* | 12/2018 | Buckner | G06F 11/076 |
| 10,181,948 B1* | 1/2019 | Nenov | G06F 8/65 |
| 10,185,595 B1* | 1/2019 | Ramatchandirane | G06F 9/5061 |
| 10,447,483 B1* | 10/2019 | Su | H04L 9/0643 |
| 10,476,847 B1* | 11/2019 | Smith | H04L 9/3239 |
| 11,429,587 B1* | 8/2022 | Barrell | G06F 16/215 |
| 2004/0080512 A1* | 4/2004 | McCormack | G09G 5/39 345/543 |
| 2004/0117758 A1* | 6/2004 | Bushey | G06F 9/445 717/100 |
| 2005/0086643 A1* | 4/2005 | Shane | G06F 11/36 717/124 |
| 2005/0097259 A1* | 5/2005 | Zievers | G06F 12/0802 711/100 |
| 2005/0108464 A1* | 5/2005 | Zievers | G06F 13/1647 711/100 |
| 2005/0125187 A1* | 6/2005 | Pomaranski | G06F 11/2733 702/121 |
| 2005/0237308 A1* | 10/2005 | Autio | G06F 3/04883 345/173 |
| 2006/0041864 A1* | 2/2006 | Holloway | G06F 11/3688 717/124 |
| 2006/0107016 A1* | 5/2006 | Murotani | G06F 3/0665 711/170 |
| 2006/0250909 A1* | 11/2006 | Chen | G11B 20/1883 369/47.11 |
| 2006/0265448 A1* | 11/2006 | Qing | G06F 11/1474 709/203 |
| 2008/0122935 A1* | 5/2008 | Ohmura | H04N 5/772 348/E5.022 |
| 2008/0184151 A1* | 7/2008 | Agarwal | G06F 8/65 715/772 |
| 2009/0064096 A1* | 3/2009 | Goebel | G06F 11/3636 717/106 |
| 2009/0100411 A1* | 4/2009 | Weiss | G06F 11/3696 717/124 |
| 2009/0292973 A1* | 11/2009 | Seol | H03M 13/47 714/763 |
| 2010/0100871 A1* | 4/2010 | Celeskey | G06F 11/3688 717/124 |
| 2010/0115182 A1* | 5/2010 | Murugesan | G06F 12/0246 711/103 |
| 2010/0142275 A1* | 6/2010 | Yogev | G11C 29/76 711/E12.008 |
| 2010/0146186 A1* | 6/2010 | Traister | G11C 11/5628 711/E12.001 |
| 2010/0162080 A1* | 6/2010 | Kinoshita | G06F 11/1016 714/763 |
| 2010/0231959 A1* | 9/2010 | Tanikawa | G06F 9/4881 358/1.15 |
| 2010/0251028 A1* | 9/2010 | Reghetti | G06F 30/13 714/39 |
| 2011/0022723 A1* | 1/2011 | Inoue | H04N 1/32789 726/3 |
| 2011/0126075 A1* | 5/2011 | Gunnam | H03M 13/3738 714/752 |
| 2011/0170131 A1* | 7/2011 | Kondo | H04N 1/34 358/1.14 |
| 2011/0252185 A1* | 10/2011 | Arya | G06F 12/0246 711/E12.001 |
| 2012/0054756 A1* | 3/2012 | Arnold | G06F 9/4881 718/102 |
| 2012/0072888 A1* | 3/2012 | Sugimoto | G06F 11/3093 717/128 |
| 2012/0101731 A1* | 4/2012 | Joseph | E21B 47/26 702/9 |
| 2012/0130960 A1* | 5/2012 | Nerger | G06F 16/244 707/690 |
| 2012/0216183 A1* | 8/2012 | Mahajan | G06F 8/65 717/170 |
| 2012/0303974 A1* | 11/2012 | Lin | G06F 21/10 713/193 |
| 2012/0331282 A1* | 12/2012 | Yurzola | G06F 1/3275 713/100 |
| 2013/0031520 A1* | 1/2013 | Asao | G06F 30/33 716/106 |
| 2013/0073513 A1* | 3/2013 | Kemper | G06F 16/28 707/600 |
| 2013/0104137 A1* | 4/2013 | Fukuzaki | G06F 9/4887 718/102 |
| 2013/0227579 A1* | 8/2013 | Kurihara | G06F 9/4881 718/102 |
| 2013/0242655 A1* | 9/2013 | Tsai | G11C 16/06 365/185.09 |
| 2013/0268788 A1* | 10/2013 | Baum | G06F 1/3278 713/323 |
| 2013/0304981 A1* | 11/2013 | Paz | G11C 7/1072 711/105 |
| 2014/0012963 A1* | 1/2014 | Swenson | H04L 41/0813 709/220 |
| 2014/0053135 A1* | 2/2014 | Bird | G06F 8/71 717/124 |
| 2014/0247667 A1* | 9/2014 | Dutta | G11C 11/5635 365/185.22 |
| 2014/0372987 A1* | 12/2014 | Strong | G06F 11/3668 717/128 |
| 2015/0089506 A1* | 3/2015 | Takasu | G06F 9/4881 718/102 |
| 2015/0095338 A1* | 4/2015 | Baggott | G06F 11/3476 707/740 |
| 2015/0100827 A1* | 4/2015 | Kho | G06F 11/1024 714/37 |
| 2015/0100835 A1* | 4/2015 | Suzuki | G06F 11/0706 714/57 |
| 2015/0234730 A1* | 8/2015 | Puthuff | G06F 11/3636 717/128 |
| 2015/0242431 A1* | 8/2015 | Vlcek | G06F 11/3072 707/753 |
| 2015/0331897 A1* | 11/2015 | Zhou | G06F 16/2365 707/692 |
| 2015/0347122 A1* | 12/2015 | Wang | G06F 8/658 717/172 |
| 2015/0355990 A1* | 12/2015 | Cole | G06F 11/3093 702/186 |
| 2016/0077926 A1* | 3/2016 | Mutalik | G06F 16/1844 711/162 |
| 2016/0133322 A1* | 5/2016 | Zamir | G11C 16/3427 708/250 |
| 2016/0140014 A1* | 5/2016 | Lampert | G06F 11/0781 714/45 |
| 2016/0154896 A1 | 6/2016 | Simitsis et al. | |
| 2016/0210094 A1* | 7/2016 | Nishikawa | H04N 1/00411 |
| 2016/0246988 A1* | 8/2016 | Kwon | G06F 16/2379 |
| 2016/0282921 A1* | 9/2016 | Kodavalla | G06F 1/324 |
| 2016/0357958 A1* | 12/2016 | Guidry | G06F 21/53 |
| 2016/0378990 A1* | 12/2016 | Goodman | G06F 21/64 726/19 |
| 2016/0380849 A1* | 12/2016 | Kawamori | G06Q 10/10 709/224 |
| 2017/0083331 A1* | 3/2017 | Burger | G06F 9/268 |
| 2017/0083335 A1* | 3/2017 | Burger | G06F 9/3855 |
| 2017/0139771 A1* | 5/2017 | Chung | G11C 29/52 |
| 2018/0011775 A1* | 1/2018 | Baines | G06F 11/362 |
| 2018/0018221 A1* | 1/2018 | Magro | G06F 11/10 |
| 2018/0041476 A1* | 2/2018 | Bentley | G06F 21/62 |
| 2018/0137131 A1* | 5/2018 | Karuppusamy | G06F 16/2365 |
| 2018/0139186 A1* | 5/2018 | Castagna | H04L 9/3242 |
| 2018/0267858 A1* | 9/2018 | Bacha | G06F 11/079 |
| 2018/0285412 A1* | 10/2018 | Zhuang | G06F 21/602 |
| 2018/0314619 A1* | 11/2018 | Jagadeesan | G06F 11/3692 |
| 2018/0329708 A1* | 11/2018 | Burger | G06F 9/3828 |
| 2018/0329740 A1* | 11/2018 | Geigel | G06F 9/5044 |
| 2018/0341527 A1* | 11/2018 | Ikkaku | G06F 9/5027 |

(56) References Cited

U.S. PATENT DOCUMENTS

| | | | |
|---|---|---|---|
| 2019/0018669 A1* | 1/2019 | Cook | G06F 16/2365 |
| 2019/0042278 A1* | 2/2019 | Pirvu | G06F 9/4411 |
| 2019/0051324 A1* | 2/2019 | Zhao | G06F 3/0616 |
| 2019/0196898 A1* | 6/2019 | Sekiguchi | G06F 11/0709 |
| 2019/0281026 A1* | 9/2019 | Mitchell | H04W 4/42 |
| 2019/0281065 A1* | 9/2019 | Xia | G06Q 20/389 |
| 2019/0294365 A1* | 9/2019 | Yoshii | G06F 12/0246 |
| 2019/0377622 A1* | 12/2019 | Kurian | G06F 11/0775 |
| 2020/0042323 A1* | 2/2020 | Sano | A61B 5/7275 |
| 2020/0042513 A1* | 2/2020 | Shima | G06Q 20/065 |
| 2020/0057626 A1* | 2/2020 | Chhuor | H04L 9/3239 |
| 2020/0151708 A1* | 5/2020 | Sui | G06Q 20/389 |
| 2020/0184739 A1* | 6/2020 | Nathan | G06Q 10/20 |
| 2020/0334383 A1* | 10/2020 | Master | H04W 12/40 |
| 2020/0344234 A1* | 10/2020 | Haque | H04L 63/102 |
| 2021/0067536 A1* | 3/2021 | Mylrea | G06F 16/27 |
| 2021/0073063 A1* | 3/2021 | Kale | G06N 3/049 |
| 2022/0045969 A1* | 2/2022 | L'Ecuyer | H04L 49/90 |

* cited by examiner

| Task State | Unique Identifier | State Information |
|---|---|---|
| Command Received | Interface Module ID | Command Descriptor |
| Command Queued | Queue Manager ID | Queue State and Queue ID of Command |
| Command Activated | Dispatch Manager ID | Task ID for Command |
| I/O Processing For Command | Drive-Side I/O Manager ID | Task ID and State For Command |
| Error Encountered | Error Handler ID | Exception ID and Associated State Information |
| Error Handled | Error Handler ID | Result of Error Handling |
| Command Status Sent To Host | Host Interface ID | Host Interface Status |
| Tracking Of Exception | Tracking Manager ID | Exception Flag |

EXCEPTION ANALYSIS FOR DATA STORAGE DEVICES

BACKGROUND

The complexity of firmware for Data Storage Devices (DSDs) has increased significantly due to the growing number of features and additional processing being performed locally at DSDs. Such increases in firmware complexity creates more issues with detecting and preventing faults or other exceptions during execution of the firmware. Logs can generally record a fault or other exception as either a time-independent statistics counter or as a time-series event log. Logs that serve as a statistics counter count the number of predefined exceptions, such as a predefined fault or the cumulative use of a component of the DSD, such as a total number of write operations performed in a flash memory. Logs that serve as a time-series event log can record the occurrence of exceptions.

However, current analytics for DSDs lacks insight into the events or states leading up to an exception. Some firmware analysis approaches may use firmware traces, but such traces are not available in many end-user environments and cover a very short time window. As a result, firmware traces are typically limited to failure analysis scenarios, rather than being used in large-scale or preventative analysis of DSDs. In addition, the use of firmware traces can lead to the collection of a large amount useless data.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 2 illustrates an example of a list for a task according to one or more embodiments.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Environments

Figure 1:
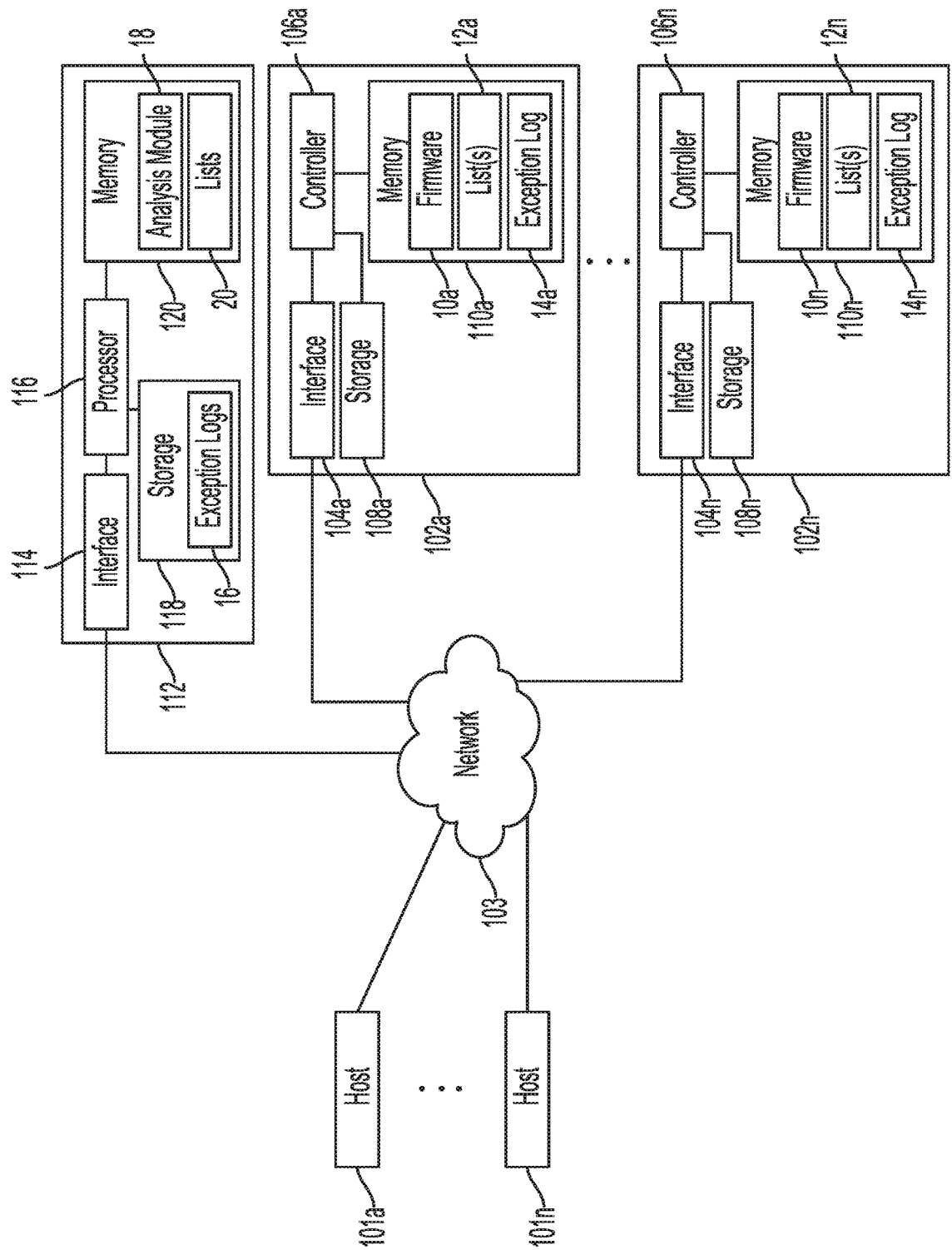
FIG. 1 is a block diagram of an example environment including Data Storage Devices (DSDs) and an exception analysis unit according to one or more embodiments.

FIG. 1 is a block diagram of an example environment including Data Storage Devices (DSDs) 102a to 102n and exception analysis unit 112 according to one or more embodiments. In the example of FIG. 1, hosts 101a to 101n communicate with DSDs 102a to 102n via network 103 to retrieve data from and store data in the DSDs. In some implementations, DSDs 102a to 102n may include, for example, Solid-State Drives (SSDs) and/or Hard Disk Drives (HDDs) in a data center, for example. In some implementations, DSDs 102 can include Solid-State Hybrid Drives (SSHDs) that include both a rotating magnetic disk and solid-state memory for storing data.

Hosts 101 can include client computers or may include processing nodes, for example. As used herein, a host can refer to a device that is capable of issuing commands to a DSD to store data or retrieve data. In this regard, host 101 may include another storage device such as a smart DSD that is capable of executing applications and communicating with other DSDs. In other implementations, a host 101 may be included in the same device as a DSD 102.

Exception analysis unit 112 can include, for example, a computer or system of the DSD manufacturer and is configured to analyze exception logs received from DSDs 102 via network 103. As shown in FIG. 1, exception analysis unit 112 includes interface 114 for communicating with DSDs 102. Interface 114 may use a standard such as, for example, Ethernet, Fibre Channel, Serial Advanced Technology Attachment (SATA), Peripheral Component Interconnect express (PCIe), Small Computer System Interface (SCSI), Serial Attached SCSI (SAS), or WiFi. In addition, interface 114 may also interface with DSDs 102 using a logical interface specification such as Non-Volatile Memory express (NVMe) or Advanced Host Controller Interface (AHCI) that may be implemented by a driver executing at exception analysis unit 112.

Network 103 can include, for example, a Local Area Network (LAN) or a Wide Area Network (WAN), such as the internet. In this regard, some or all of hosts 101, DSDs 102, and exception analysis unit 112 may not be physically co-located or may be located with the same data center. For example, in some implementations, DSDs 102 can provide a cloud storage for hosts 101. Exception analysis unit 112 can include a manufacturer's system for assessing operation of the firmware of DSDs 102 in the field under actual end-user workloads. As discussed in more detail below, the analysis of such actual use cases can ordinarily provide for more information for firmware updates or future firmware design.

Processor 116 of exception analysis unit 112 can include circuitry such as one or more processors for executing instructions and can include, for example, a microcontroller, a Digital Signal Processor (DSP), an Application Specific Integrated Circuit (ASIC), a Field Programmable Gate Array (FPGA), hard-wired logic, analog circuitry and/or a combination thereof. In some implementations, processor 116 can include a System on a Chip (SoC). Processor 116 can access memory 120 to execute instructions, such as those from analysis module 18, or to access data used while executing such instructions, such as lists 20.

Memory 120 can include, for example, a volatile RAM such as Dynamic RAM (DRAM), a non-volatile RAM, or other solid-state memory. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory (i.e., two or more levels), or any combination thereof), NOR memory, EEPROM, Ferroelectric Memory (FeRAM), Magnetoresistive RAM (MRAM), other discrete NVM chips, or any combination thereof.

Exception analysis unit 112 can also include storage 118, which can include a non-volatile storage, such as a solid-state memory (e.g., an SSD) or a rotating magnetic disk (e.g., an HDD) that may store data not in current use by processor 116. Such data can include, for example, exception logs 16 collected from DSDs 102 over time. As discussed in more detail below, each of the DSDs 102 can store an exception log 14a that records the occurrence of exceptions, such as an error, resource level, or other predefined event encountered while performing a task.

In the present disclosure, exception logs 14 can also include one or more lists or data structures 12 that indicate the order in which portions of code or firmware for the DSDs is executing in performing a task. The use of such data structures can ordinarily improve the ability to analyze exceptions, such as errors or other states of the DSD, so that sequences of execution related to certain exceptions can be identified during a failure analysis of the DSD or to optimize performance of DSDs 102. In some cases, a firmware may be updated in the field or changed for DSDs leaving the factory based on the identification of a particular sequence of code execution.

In the example of FIG. 1, memory 120 of exception analysis unit 112 is used by processor 116 to store data. Data stored in memory 120 can include data read from storage 118, data to be stored in storage 118, instructions loaded from analysis module 18 for execution by processor 116, and/or data used in executing analysis module 18. As discussed in more detail below, such data may include lists or data structures 20 from exception logs 16 stored in storage 118. As will be appreciated by those of ordinary skill in the art, some or all of analysis module 18 and data structures or lists 20 may be stored in other memory or memories than memory 120, such as in storage 118 and/or a memory of processor 116.

As shown in FIG. 1, DSDs 102 each include an interface 104, controller 106, storage 108, and memory 110. Interface 104 is configured to allow DSD 102 to communicate on network 103 and may use a standard such as, for example, SATA, PCIe, SCSI, SAS, Ethernet, Fibre Channel, or WiFi. Each DSD in FIG. 1 also includes a controller 106 that controls operation of the DSD by executing firmware 10 loaded in memory 110 of the DSD. Controller 106 can include circuitry such as one or more processors for executing instructions and can include, for example, a microcontroller, a DSP, an ASIC, an FPGA, hard-wired logic, analog circuitry and/or a combination thereof. In some implementations, controller 106 can include an SoC. Controller 106 can access memory 110 to execute instructions, such as those from firmware 10 used to control operation of DSD 102.

Memory 110 can include, for example, a volatile RAM such as DRAM, a non-volatile RAM, or other solid-state memory. In the example of FIG. 1, memory 110 can be used by DSD 102 to store data used by controller 106. Data stored in memory 110 can include data read from storage 108, data to be stored in storage 108, instructions loaded from firmware 10 for execution by controller 106, and/or data used in executing firmware 10.

Such data may include one or more lists or data structures 12 that indicate an order in which portions of firmware 10 or other code is executed for a task. In this regard, firmware or code executed by controller 106 can be treated as a state machine or stateful system so that lists or data structures 12 can be reviewed to identify causes of an exception. Such state information of firmware 10 would not be available with conventional exception logs to show what occurred or which code portions executed leading up to an exception.

For example, a particular event, such as the use of a semaphore for a task may occur during a second state, which can correspond to the execution of a second portion of firmware or code for performing the task. Later, when a portion of the code or firmware is executed as a fifth state during the task, an error may occur such as running out of memory for a sub-process or a stall. The use of associated state information and/or the sequence of firmware or code execution can be reviewed or analyzed to identify the significance one or more causes for the error, such as the use of the semaphore in the second state. In this regard, an order of code execution indicated by a list or data structure 12 and/or state information associated with different states indicated by the list or data structure 12 can serve as a signature detection for identifying the causes of exceptions.

Lists or data structures 12 can also allow for more state information to be retained for more complex tasks that involve a greater number of code or firmware portions or involve a greater amount of switching among different code or firmware portions than for simpler tasks that involve less code or firmware portions or do not switch as much between execution of different code or firmware portions. This can ordinarily provide for a data collection proportionality so that more information is collected for tasks that are more complex that are more likely to need more information to determine the cause of an exception. In some implementations, the amount of data retained for a task may be limited to a predetermined number of code or firmware execution transitions or states. In such implementations, lists or data structures 12 can operate as a first-in, first-out queue so that the oldest collected information is purged to make room for the most recent collected information when the list or data structure has reached the predetermined number of states or transitions of code or firmware execution for the task.

Lists or data structures 12 can also include state information for DSD 102 while the task is executed, such as information about resource allocation, path overhead, semaphores, locks, and/or state flags used to determine or control the flow or sequence of code execution. In some cases, the state information can include context information that may be used to restore or continue execution of the task if execution of the task is interrupted. In other cases, the state information can include physical conditions of DSD 102, such as a high operating temperature. As discussed in more detail below, lists or data structures 12 provide insight into the sequence of events and/or state information of DSD 102 leading up to an exception, which can be used for large-scale, preventative analysis of DSD firmware, for example.

As shown in the example of FIG. 1, memory 110 of DSDs 102 can also store respective exception logs 14 for recording lists or data structures 12 that encounter an exception during execution of a task. Exceptions can include, for example, an error or other predetermined event, such as stalling during execution of the task, a threshold level of memory usage, or other resource availability level during execution of the task. As discussed in more detail below, lists or data structures 12 for tasks that complete without encountering an exception can be deleted from memory 110 in some implementations so as not to take up space. As will be appreciated by those of ordinary skill in the art, some or all of firmware 10, data structures or lists 12, and exception logs 14 may be stored in other memory or memories than memory 110, such as in storage 108 and/or a memory of controller 106. For example, in some cases, exception log 14 can be stored in storage 108 of DSD 102. Storage 108 can include, for example, a non-volatile solid-state memory (e.g., where DSD 102 is an SSD) or a rotating magnetic disk (e.g., where DSD 102 is an HDD).

Those of ordinary skill in the art will also appreciate that other implementations can include more or less than the elements shown in FIG. 1, and that the processes discussed herein can be implemented in other environments. For example, other environments can include a different number of hosts, DSDs, or may not include exception analysis unit 112. In this regard, some implementations may only include a single host 101 and a single DSD housed together as a single electronic device, such as a desktop, laptop, tablet, smartphone, digital video recorder, television, or digital camera. In other implementations, a host 101 and a DSD 102 may not be connected via a network, but may instead be connected via a direct connection or bus, such as a Universal Serial Bus (USB).

FIG. 2 illustrates an example of list 12 according to one or more embodiments where the entries of list 12 indicate an order of execution of different portions of firmware 10 or other code for a task. As shown in FIG. 2, list 12 includes a unique identifier for different firmware or code portions executed for a task and optionally includes state information for the task at different points during execution of the task. As used herein, a task can refer to a unit of work to be performed by DSD 102. Tasks can include host-initiated tasks, such as commands to store or return data for a host, and can include DSD-initiated tasks, such as maintenance tasks like garbage collection of storage 108.

In the example of FIG. 2, the task associated with list 12 is the performance of a command received from a host to access data stored in DSD 102. The state of the task is provided in the left column for illustration, but is not necessarily included as part of list 12. In the example of FIG. 2, a command is received from a host 101 and a unique identifier for an interface module of firmware 10 is added as an initial entry in list 12. A command descriptor is also added in the first entry as state information that can indicate, for example, a command code, format, or parameters for the command.

The command is then queued by a queue manager portion of firmware 10, following the execution of the interface module. A new entry is added to list 12 including a unique identifier for the queue manager portion of firmware 10, together with a queue state and queue identifier for the command. The queue state can include, for example, the number of pending commands in the queue when the command is added to the queue. The queue identifier can include an identifier assigned to the command by the queue manager.

The command is then activated by a dispatch manager portion of firmware 10. An identifier for the dispatch manager is added to a third entry in list 12 with a task identifier as state information that is assigned by the dispatch manager for the command.

The command is then processed by a drive-side I/O manager to access data from a memory of DSD 102 (e.g., storage 108). A unique identifier for the drive-side manager portion of firmware 10 is added to a new entry with state information including the task identifier and a current state of the command, such as a physical address to be accessed on a storage media.

In the example of FIG. 2, an error is encountered during the performance of the command. In response, a unique identifier for an error handler portion of firmware 10 is added to an entry in list 12 with an exception identifier for the specific type of error encountered and associated state information for the error. The error handler then provides the result of the error handling as state information in a next entry that is also associated with the unique identifier for the error handler portion of firmware 10.

The command status (e.g., command failed) is then sent to the host and a unique identifier for a host interface portion of firmware 10 is added in a new entry in list 12. A host interface status, such as available or busy, may also be included in the entry as state information.

A tracking manager portion of firmware 10 adds a final entry to list 12 to indicate the unique identifier of the tracking manager and an exception flag for the error. The exception flag may indicate, for example, the type of exception (e.g., I/O error) and/or may serve to indicate that list 12 includes an exception and should be retained in exception log 14 for DSD 102.

In some implementations, the entries in list 12 may form a blockchain that are cryptographically linked. For example, each entry may include a pointer address, a timestamp, and a hash result derived from the pointer address of the previous entry, with the exception of the first entry, which would not have a hash result for a previous entry. The use of a blockchain can ordinarily provide security for users of DSDs 102. In some implementations, an end-to-end encryption may be used so that only the DSD and exception analysis unit 112 can decrypt lists or data structures 12.

As will be appreciated by those of ordinary skill in the art, other implementations can include a different arrangement for list 12 to provide a different type of data structure. For example, list 12 may include indices to indicate the order of execution of different portions of firmware 10. In some implementations, list 12 may include a single metadata container that includes an internal structure, such as a linked list of entries within the container. Other implementations may use a different type of data structure, such as where each entry is a separate container that may be linked or otherwise indicate an order of execution of firmware or code portions for a task. In addition, other examples may include different portions of firmware or code than those discussed above for the example task of FIG. 2 or may include different types of state information in list 12. In this regard, list 12 in some implementations may not include any state information and may only include unique identifiers for the portions of firmware or code executed for the task.

Example Processes

Figure 3:
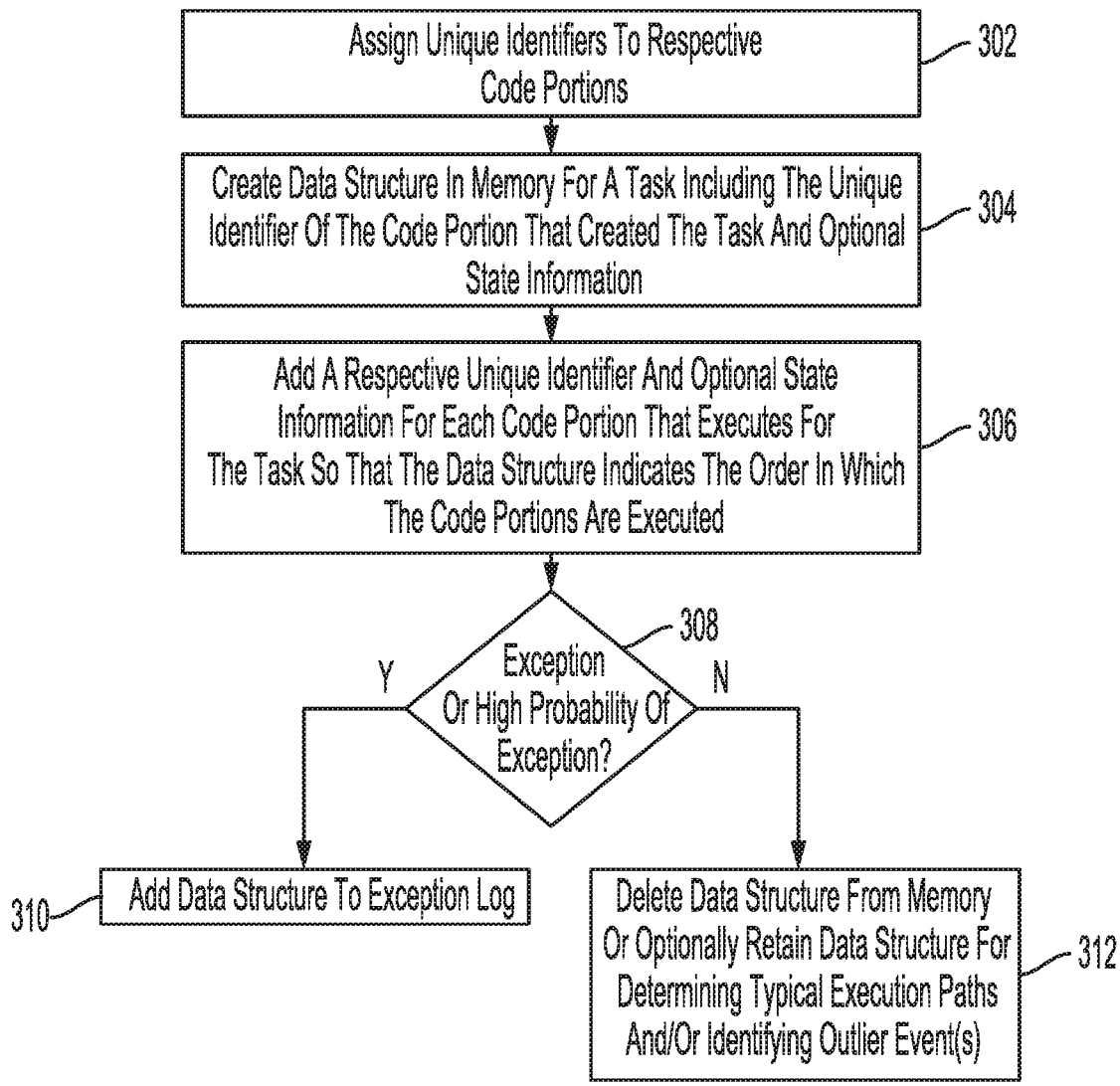
FIG. 3 is an information collection process for a task according to one or more embodiments.

FIG. 3 is an information collection process for a task according to one or more embodiments. The process of FIG. 3 can be performed, for example, by controller 106 of DSD 102 executing firmware 10.

In block 302, unique identifiers are assigned to respective code portions. In some implementations, firmware 10 may include unique identifiers in its code, such as in headers for different functions or modules. In such implementations, controller 106 may assign unique identifiers by accessing such portions of the code when it is loaded into memory 110. In other implementations, controller 106 may assign unique identifiers such as a value for code portions that have been loaded into memory 110 or that have been otherwise identified for execution.

In block 304, controller 106 creates a data structure, such as a list similar to list 12 in FIG. 1, for a task including the unique identifier of the code portion that created the task. As discussed above with reference to the example list of FIG.

2, the data structure may also include state information indicating a condition of DSD 102 or a state for the task.

In block 306, a respective unique identifier and optional state information is added to the data structure for each code portion that executes for the task. The data structure indicates an order in which the code portions are executed for the task. As noted above, the order in which the code portions are executed may be provided with a numbering or linking of entries or blocks in the data structure.

In block 308, it is determined whether an exception occurred during execution of the task or if there is a high probability (e.g., greater than a threshold probability) of a future exception based on the sequence of code portions or state information collected in the data structure. An exception can include a predefined event, such as an error or a state of DSD 102. For example, the exception can include a latency in performing a portion of the task that exceeds a threshold time or a lack of resources such as available memory or available processing resources while performing the task.

In some implementations, controller 106 may identify state information in the data structure or determine that the sequence of execution for the code portions has more than a threshold probability of resulting in an exception after completion of the task. For example, controller 106 may use a mathematical or algebraic algorithm, such as a checksum, with the unique identifiers for the code portions as inputs to identify a sequence of execution that is invalid or that may be associated with a higher probability of a future exception, such as with the use of a probabilistic data structure. In other examples, state information in the data structure may indicate a high probability of a future exception.

If it is determined in block 308 that an exception occurred during the execution of the task or that there is greater than a threshold probability of a future exception, the data structure for the task is added to an exception log, such as exception log 14 in the example of FIG. 1. On the other hand, if no exception occurred during execution of the task or that there is not a higher probability of a future exception, the data structure is deleted in block 312 or may be optionally retained to determine typical execution paths and/or to identify outlier events that may be defined as new exceptions.

In deleting the data structure, storage space in DSD 102 can ordinarily be conserved. However, in some implementations, a sampling of data structures for tasks can be analyzed by controller 106 or exception analysis unit 112 in FIG. 1 to identify new exceptions that can be added to the firmware for future DSDs. In such cases, the retention of data structures may be a substantially random or stochastic sampling, or may follow a pattern, such as retaining one of every one hundred data structures. In this regard, exception events may be defined statically or may be defined as a result of using a rule-based algorithm, such as machine learning, to identify outlier events from a plurality of lists or data structures.

As discussed in more detail below with reference to the sequence identification process of FIG. 4, a plurality of data structures in an exception log can be compared to identify common sequences of firmware execution. Similarly, data structures added to a plurality of exception logs for respective DSDs can be analyzed by a device, such as exception analysis unit 112 in the example of FIG. 1, to identify sequences of code execution associated with a higher probability of encountering an exception during execution. In some cases, a plurality of data structures can be input into a neural network to identify such sequences of code execution.

Figure 4:
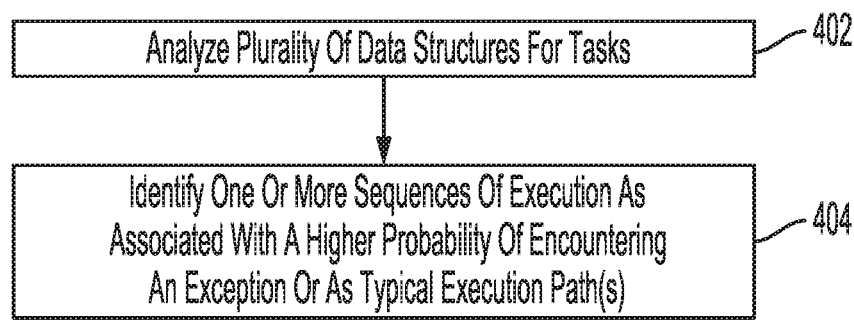
FIG. 4 is a flowchart for a sequence identification process according to one or more embodiments.

FIG. 4 is a flowchart for a sequence identification process according to one or more embodiments. The process of FIG. 4 can be performed, for example, by controller 106 of DSD 102 executing firmware 10 for a single DSD or by processor 116 of exception analysis unit 112 executing analysis module 18 for one or more DSDs (e.g., DSDs 102 in FIG. 1). In some implementations, the process of FIG. 4 may be performed as part of a fleet analysis of a large number of DSDs.

In block 402, a plurality of data structures or lists are analyzed for tasks. The tasks may all be of the same type, such as the performance of a write command from a host, or the tasks may be for a random sampling of different tasks. In some implementations, the tasks corresponding to the analyzed data structures or lists may be only for those tasks that have experienced a particular type of error or exception. In this regard, the process of FIG. 4 may be performed as a failure analysis for a single DSD or for a plurality of DSDs either in the field or at a manufacturer's facility. As discussed above, the entries or blocks in the data structures may be cryptographically linked as a blockchain and/or encrypted as a security measure.

In block 404, one or more sequences of execution are identified as being associated with a higher probability of resulting in an exception or as typical execution paths. For example, certain sequences of execution may be common among tasks that encountered a particular exception or may be a typical execution path or order for certain task types. In some cases, a neural network may be implemented by exception analysis unit 112 to input the plurality of data structures into a neural network, such as an auto-encoder abnormality detection. Such analysis may provide a predictive result for modifying DSD firmware to avoid an exception by identifying a sequence of execution that may result in a higher probability of encountering an exception during the task or after the task. In addition, new outlier events or exceptions may be defined based on such analysis.

As discussed above, the analysis of a plurality of data structures or lists for tasks can allow controller 106 to perform self-diagnostics to change the execution of firmware or can provide large scale analytics or fleet analysis for exposure analytics, risk assessment, or insights into critical code execution paths. Such critical code execution paths can identify resources that should not be accessed by more than one process at a time, since concurrent access may lead to an exception or other unexpected result.

Figure 5:
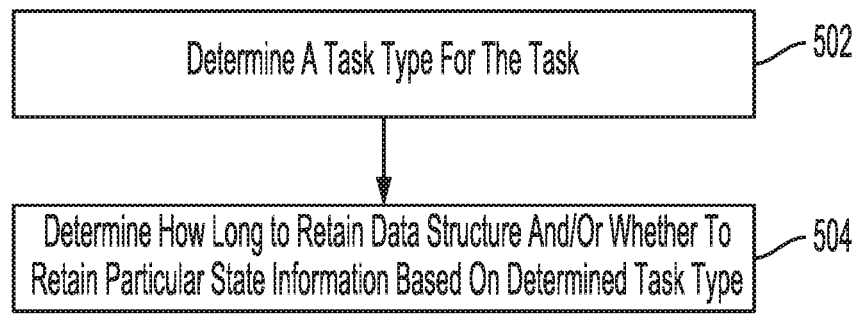
FIG. 5 is a flowchart for a data retention process according to one or more embodiments.

FIG. 5 is a flowchart for a data retention process according to one or more embodiments. The process of FIG. 5 can be executed, for example, by controller 106 of DSD 102 executing firmware 10.

In block 502, a task type is determined for a task. For example, the task type can be a host-initiated task type for tasks initiated by a host, such as a host 101 in FIG. 1, or a DSD-initiated task type for tasks initiated by a DSD. A host-initiated task can include, for example, performance of a command such as a write or read command received from the host. A DSD-initiated task can include, for example, performance of a maintenance operation such as a garbage collection task or rewriting data to ensure the integrity of the rewritten data. In other examples, the task type can be based on the performance of a certain type of command, such as a write command task type or a read command task type.

Based on the task type determined in block 502, it is further determined in block 502 how long to retain a corresponding data structure for the task and/or whether to retain particular state information for the task. For example, a data structure, such as a list 12, can be retained for a longer time period if it is determined in block 502 that the task type is a host-initiated task type rather than a DSD-initiated task type. An example of such an implementation may store data structures for host-initiated tasks that execute without an exception for one day, while data structures for DSD-initiated tasks that execute without an exception may be deleted following completion of the task. In some cases, host-initiated tasks may be kept longer to provide information that can be used to improve the performance of the DSD in terms of a Quality of Service (QoS) for performing host commands, such as by increasing a number of Input/Output Operations Per Second (IOPS).

In other cases, state information that has been collected in a data structure may be discarded or have a shorter retention period determined in block 504 based on the task type determined in block 502. For example, state information indicating addresses for data (e.g., Logical Block Addresses (LBAs), Physical Block Addresses (PBAs)) may be kept longer for tasks that are determined to be a write command task type than for tasks determined to be a read command task type.

As discussed above, by using data structures or lists that indicate an execution sequence of code or firmware portions and optionally recording state information, it is ordinarily possible to identify sequences of execution in increasingly complex DSD firmware that have a higher probability of causing an exception. The collection of such lists or data structures for multiple DSDs over a longer period of time can allow for large-scale failure analysis or preventative analysis of DSD firmware, while reducing the amount of information collected for tasks that do not result in an exception. In addition, the foregoing use of lists or data structures for tasks can allow for the collection of information, such as an order of code execution and/or state information, for actual end-user tasks in the field, as opposed to a simulated testing performed at a manufacturer's facility.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Data Storage Device (DSD), comprising:
   firmware comprising a plurality of portions each identified by a respective unique identifier;
   a memory configured to store list with a first entry in the list storing the unique identifier of the firmware portion that created a task, the task being of a particular task type, wherein the task type indicates one of a maintenance operation initiated by the DSD, a write command initiated by a host that is separate from the DSD, or a read command initiated by the host; and
   a controller configured to:
      execute firmware portions to execute the task;
      update the memory to include a new entry to the list after each firmware portion executes for the task, wherein each entry indicates the unique identifier identifying the firmware portion corresponding to the entry, and wherein the list indicates the order in which the firmware portions were executed and is used for exception analysis of the firmware of the DSD;
      retain the list in the memory for a duration of time and retain particular state information for the task in the list, wherein an amount of the particular state information for the task stored in the list is proportional to a number of code switches among the firmware portions executed for the task, and wherein the duration of time is based on the task type;
      update the firmware of the DSD based on a sequence of firmware execution identified from using the retained list for the task; and
      execute the updated firmware.

2. The DSD of claim 1, wherein the list is a blockchain with entries in the list being cryptographically linked.

3. The DSD of claim 1, wherein the controller is further configured to:
add the list to an exception log responsive to an exception being detected.

4. The DSD of claim 3, wherein a comparison of a plurality of lists in the exception log indicates one or more sequences of firmware execution common among different lists of the plurality of lists.

5. The DSD of claim 1, wherein the controller is further configured to randomly store linked lists for different tasks executed by the controller, wherein typical execution paths of the firmware are determined based on the randomly stored linked lists.

6. The DSD of claim 1, wherein the controller is further configured to:
delete the list from the memory responsive to a determination that the task completed without an exception.

7. The DSD of claim 1, wherein the duration of time for a host-initiated task type is longer than for a DSD-initiated task type.

8. A method executed by a Data Storage Device (DSD), the method comprising:
executing a plurality of code portions to execute a task, each of the code portions identified by a respective unique identifier, the task being of a particular task type, wherein the task type is one of a host-initiated task type for tasks initiated by a host that is separate from the DSD or a DSD-initiated task type for tasks initiated by the DSD, wherein the DSD-initiated task type indicates a maintenance operation initiated by the DSD and the host-initiated task type indicates a command initiated by the host, and wherein the host is configured to issue commands to the DSD to store data in the DSD and to retrieve data from the DSD, the DSD comprising a data structure storing the unique identifier of the code portion that created the task;
updating the data structure to include a new unique identifier to the data structure after each code portion executes for the task, wherein the data structure indicates the order in which the code portions were executed by the DSD and is used for exception analysis of the code;
retaining the data structure in a memory of the DSD for a first period of time responsive to a determination that the task type of the task is a DSD-initiated task type;
retaining the data structure in the memory for a second period of time greater than the first period of time responsive to a determination that the task type of the task is a host-initiated task type;
updating a firmware of the DSD based on a sequence of code execution identified from using the retained data structure for the task to improve performance of the DSD in executing host commands; and
executing the updated firmware.

9. The method of claim 8, wherein the data structure is a blockchain including blocks that are cryptographically linked.

10. The method of claim 8, further comprising:
adding the data structure to an exception log responsive to an exception being detected.

11. The method of claim 10, wherein a comparison of a plurality of data structures in the exception log indicates one or more common sequences of code execution among different data structures in the plurality of data structures.

12. The method of claim 10, wherein a comparison of data structures added to a plurality of exception logs for respective DSDs indicates sequences of code execution associated with a higher probability of encountering an exception during execution of the firmware.

13. The method of claim 8, further comprising storing state information for the task in the data structure.

14. The method of claim 8, further comprising inputting a plurality of data structures into a neural network, wherein sequences of firmware execution associated with a higher probability of encountering an exception during execution are identified based on the neural network.

15. The method of claim 8, further comprising:
randomly retaining data structures for different tasks after completion of the tasks, wherein typical execution paths of the firmware are determined based on the retained data structures; and
adding an indication of an outlier event to an exception log for the DSD based on an identification of the outlier event using the determined typical execution paths and in response to the DSD encountering the identified outlier event.

16. The method of claim 8, further comprising:
retaining particular state information in the data structure based on the determined task type.

17. The method of claim 8, wherein the maintenance operation is garbage collection task.

18. A non-transitory computer readable medium storing computer-executable instructions, wherein when the computer-executable instructions are executed by a controller of a Data Storage Device (DSD), the computer-executable instructions cause the controller to:
store a list in a memory of the DSD, the list having a first entry storing a unique identifier of a portion of firmware that created a task, the task being of a particular task type, wherein the task type indicates one of a maintenance operation initiated by the DSD, a write command initiated by a host that is separate from the DSD, or a read command initiated by the host, and wherein the DSD comprises firmware having a plurality of portions each identified by a unique identifier;
execute firmware portions to execute the task;
update the memory to include a new entry to the list after each firmware portion is executed by the controller for the task, wherein each entry indicates the unique identifier identifying the firmware portion corresponding to the entry, wherein the list indicates the order in which the firmware portions were executed and is used for exception analysis of the firmware of the DSD;
retain the list in the memory for a duration of time and retain particular state information for the task in the list, wherein an amount of the particular state information for the task stored in the list is proportional to a number of code switches among the firmware portions executed for the task, and wherein the duration of time is based on the task type;
update the firmware of the DSD based on a sequence of firmware execution identified from using the retained list for the task; and
execute the updated firmware.

19. The non-transitory computer readable medium of claim 18, wherein the list is a blockchain with the entries in the list being cryptographically linked.

20. The non-transitory computer readable medium of claim 18, wherein the duration of time for a host-initiated task type is longer than for a DSD-initiated task type.

* * * * *